United States Patent
Jonsson

(10) Patent No.: US 8,849,930 B2
(45) Date of Patent: Sep. 30, 2014

(54) USER-BASED SEMANTIC METADATA FOR TEXT MESSAGES

(75) Inventor: Håkan Lars Emanuel Jonsson, Hjärup (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 215 days.

(21) Appl. No.: 13/130,850

(22) PCT Filed: Jun. 16, 2010

(86) PCT No.: PCT/IB2010/052716
§ 371 (c)(1),
(2), (4) Date: Sep. 15, 2011

(87) PCT Pub. No.: WO2011/158066
PCT Pub. Date: Dec. 22, 2011

(65) Prior Publication Data
US 2011/0320548 A1    Dec. 29, 2011

(51) Int. Cl.
| | |
|---|---|
| G06F 15/16 | (2006.01) |
| H04L 12/58 | (2006.01) |
| G06F 17/27 | (2006.01) |
| G06F 3/023 | (2006.01) |
| G06F 17/20 | (2006.01) |
| G06F 17/24 | (2006.01) |
| G06F 12/00 | (2006.01) |
| H04M 1/725 | (2006.01) |

(52) U.S. Cl.
CPC ....... *H04L 12/5895* (2013.01); *H04M 1/72552* (2013.01); *H04L 51/38* (2013.01); *G06F 17/2785* (2013.01); *G06F 3/0237* (2013.01); *G06F 17/20* (2013.01); *G06F 17/241* (2013.01)
USPC ........................................... 709/206; 709/207

(58) Field of Classification Search
USPC .................. 709/203, 206–207, 225–229, 250
See application file for complete search history.

(56) References Cited

U.S. PATENT DOCUMENTS

| | | | |
|---|---|---|---|
| 6,243,670 B1 * | 6/2001 | Bessho et al. | 704/9 |
| 2003/0018752 A1 * | 1/2003 | Lowy | 709/219 |
| 2003/0154446 A1 * | 8/2003 | Constant et al. | 715/531 |
| 2003/0191689 A1 * | 10/2003 | Bosarge et al. | 705/14 |
| 2004/0117173 A1 | 6/2004 | Ford et al. | |
| 2005/0156947 A1 * | 7/2005 | Sakai et al. | 345/629 |
| 2006/0218234 A1 * | 9/2006 | Deng et al. | 709/206 |

(Continued)

FOREIGN PATENT DOCUMENTS

| | | |
|---|---|---|
| WO | WO 2008/074395 A1 | 6/2008 |
| WO | WO 2009/128838 A1 | 10/2009 |

OTHER PUBLICATIONS

International Search Report dated Apr. 5, 2011 issued in corresponding PCT application No. PCT/IB2010/052716, 10 pages.

(Continued)

*Primary Examiner* — Zarni Maung
(74) *Attorney, Agent, or Firm* — Snyder, Clark, Lesch & Chung, LLP

(57) ABSTRACT

Methods, devices, and computer-readable medium described herein may provide for the adding of user-based semantic metadata to a text message. The semantic metadata may be added at a sending user device based on a user's selection. A receiving user device may interpret the text message based on the semantic metadata.

20 Claims, 11 Drawing Sheets

(56) References Cited

U.S. PATENT DOCUMENTS

2008/0162439 A1* 7/2008 Bosarge et al. .................. 707/3
2008/0280633 A1* 11/2008 Agiv ............................. 455/466
2008/0319735 A1* 12/2008 Kambhatla et al. ............... 704/9
2009/0077113 A1* 3/2009 Fidaali et al. ................. 707/102

OTHER PUBLICATIONS

International Preliminary Report on Patentability dated Jan. 3, 2013 issued in corresponding PCT application No. PCT/IB2010/052716, 6 pages.

* cited by examiner

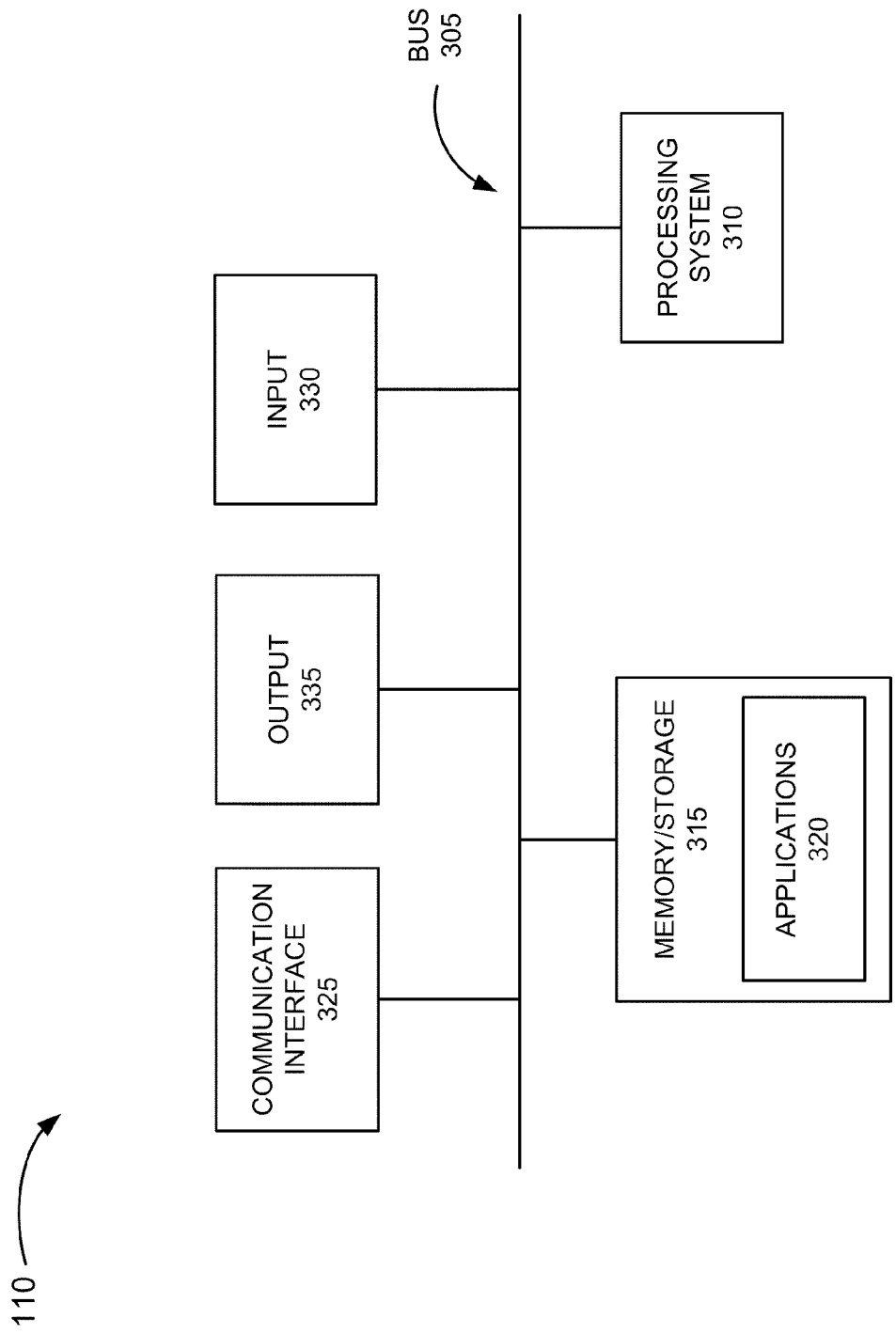

| WORDS 425 | SEMANTIC INFORMATION 430 |
|---|---|
| VARA | LOCATION ADVERB, VERB |
| CENTRALEN | NOUN, LOCATION |
| ••• | |
| KLEENEX | NOUN, BRAND NAME |
| | |
| ••• | |

USER-BASED SEMANTIC METADATA FOR TEXT MESSAGES

BACKGROUND

Text messaging between users has risen in recent years. User devices, such as, for example, portable devices, allow users to create text messages anytime and anywhere. The user device that receives a text message can use natural language processing to interpret the text message. However, a drawback to this approach is that the user device that receives the text message can incorrectly interpret the text message. Additionally, the user device can incorrectly perform other user-assistive processes due to the incorrect interpretation of the text message.

SUMMARY

According to one aspect, a method may be performed by a user device to compose a text message. The method may comprise receiving a user request to compose a text message; receiving a text input; providing semantic information associated with the text input; receiving a user selection of the semantic information; adding semantic metadata with the text message in correspondence to the user selection; and sending the text message with the semantic metadata to a recipient user device.

Additionally, the text input may correspond to a word or a portion of a word.

Additionally, when the text input corresponds to the portion of the word, the method may further comprise providing text prediction, wherein the semantic information is displayed with one or more text-predictive words.

Additionally, the semantic information may include word type information.

Additionally, the word type information may comprise an indication of when the text input corresponds to one of a location or a brand name.

Additionally, the word type information may comprise an indication of when the text input corresponds to one of a verb, a noun, an adverb, or an adjective.

Additionally, the text message may correspond to a multimedia messaging service message or an e-mail message.

Additionally, the adding may comprise adding the semantic metadata in a form corresponding to one of a Multipurpose Internet Mail Extension attachment, an Extensible Markup Language snippet, or a Uniform Resource Identifier.

According to another aspect, a user device may comprise components configured to receive a user request to compose a text message; receive a text input; provide semantic information associated with the text input; receive a user selection of the semantic information; add semantic metadata with the text message in correspondence to the user selection; and send the text message with the semantic metadata to a recipient user device.

Additionally, the user device may comprise a wireless telephone.

Additionally, the text input may correspond to a word or a portion of a word.

Additionally, when the text input corresponds to the portion of the word, the components may be further configured to provide text prediction, wherein the semantic information includes word type information.

Additionally, the word type information may comprise an indication of when the text input corresponds to one of a location, a brand name, a noun, a verb, an adverb, or an adjective.

Additionally, the text message may correspond to a multimedia message service or an e-mail message.

Additionally, the components may be further configured to receive the text message with the semantic metadata; and interpret the text message based on the semantic metadata.

Additionally, the semantic metadata may be in a form corresponding to one of a Multipurpose Internet Mail Extension attachment, an Extensible Markup Language snippet, or a Uniform Resource Identifier.

According to yet another aspect, computer-readable medium may contain instructions executable by at least one processing system. The computer-readable medium storing instructions for: receiving a user request to compose a text message; receiving a text input; providing semantic information associated with the text input; receiving a user selection of the semantic information; adding semantic metadata with the text message in correspondence to the user selection; and sending the text message with the semantic metadata to a recipient user device.

Additionally, the computer-readable medium may reside in a user device that comprises a radio telephone.

Additionally, the computer-readable medium may store one or more instructions for providing text prediction, wherein the semantic information is displayed with one or more text-predictive words.

Additionally, the semantic information comprises an indication of when the text input corresponds to one of a location, a brand name, a noun, a verb, an adverb, or an adjective.

BRIEF DESCRIPTION OF THE DRAWINGS

FIG. 3 is a diagram illustrating exemplary components of the user device;

FIG. 4B is a diagram illustrating an exemplary database;

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims.

The term "text message," as used herein, is intended to be broadly interpreted to include a message that includes text. For example, a text message may correspond to a multimedia messaging service (MMS) message or an e-mail message.

According to exemplary embodiments, a user device may provide a user interface (e.g., a graphical user interface (GUI)) that allows a user to select the meaning of words when the user is composing a text message. The user device may include/add semantic metadata with the text message in correspondence to the user's selections. By way of example, according to an exemplary implementation, the semantic metadata may correspond to a Multipurpose Internet Mail Extension (MIME) attachment, Extensible Markup Language (XML) snippets (e.g., to Hypertext Markup Language (HTML)), or some other form of metadata. The user device may send the text message with the semantic metadata to another device (e.g., another user device). The user device that receives the text message and the semantic metadata may interpret the text message based on the semantic metadata.

Figure 1A:
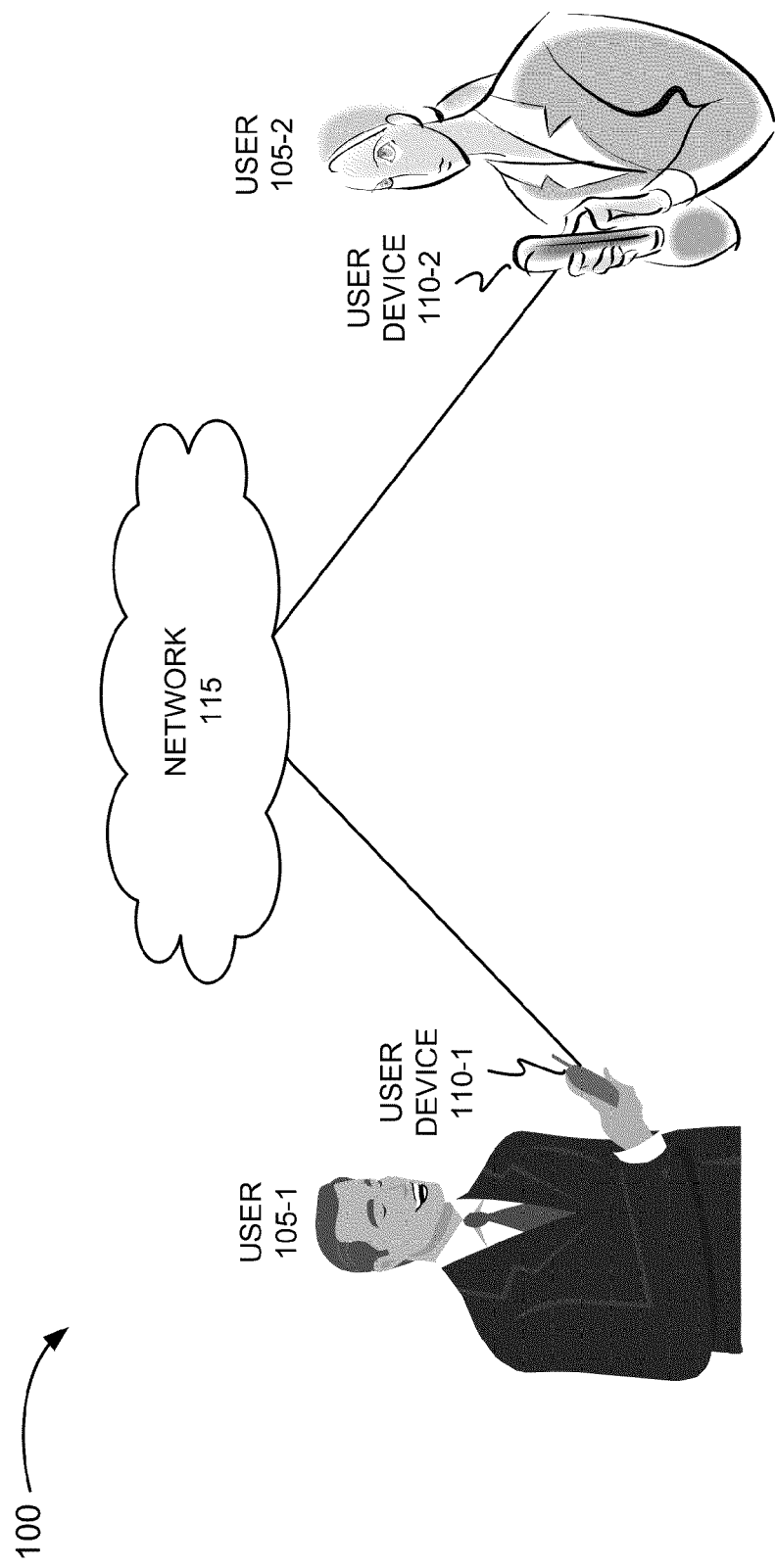
FIG. 1A is a diagram illustrating an exemplary environment in which an exemplary embodiment for providing user-based semantic metadata with a text message may be implemented.

FIG. 1A is a diagram illustrating an exemplary environment 100 in which an exemplary embodiment for providing user-based semantic metadata with a text message may be implemented. As illustrated, environment 100 may include users 105-1 and 105-2 (referred to generally as user 105 or users 105), user devices 110-1 and 110-2 (referred to generally as user device 110 or user devices 110), and a network 115.

The number of devices and configuration in environment 100 is exemplary and provided for simplicity. In practice, environment 100 may include more devices and/or networks, fewer devices and/or networks, different devices and/or networks, and/or differently arranged devices and/or networks than those illustrated in FIG. 1A. Also, some functions described as being performed by a particular device may be performed by a different device or a combination of devices.

User 105 may correspond to a person that operates user device 110 to communicate text messages. User device 110 may include a device capable of communicating with other devices, systems, networks, and/or the like. User device 110 may correspond to a portable device, a mobile device, a handheld device, or a stationary device. By way of example, user device 110 may take the form of a computer (e.g., a desktop computer, a laptop computer, a handheld computer, etc.), a personal digital assistant (PDA), a wireless telephone (e.g., a radio telephone, etc.), a vehicle-based device, or some other type of communication device. User device 110 may be capable of sending and receiving text messages. User device 110 may include a text messaging client.

Network 115 may include one or more networks of any type (i.e., wired and/or wireless). For example, network 115 may include a local area network (LAN), a wide area network (WAN), a data network, a private network, a public network, the Internet, and/or a combination of networks.

Figure 1B:
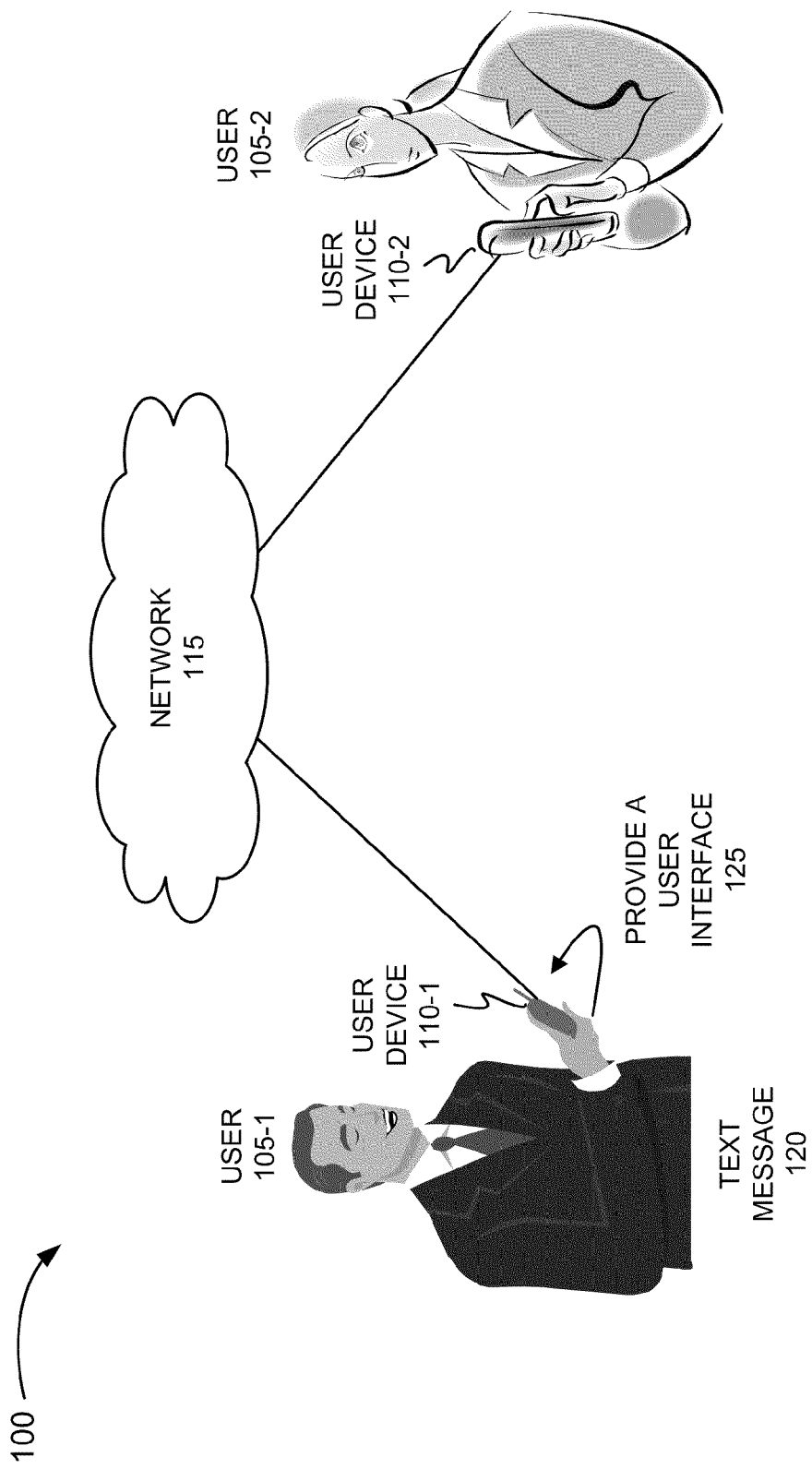
FIGS. 1B-1E are diagrams illustrating an exemplary process for providing user-based semantic metadata by the user devices depicted in FIG. 1A.
Figure 1C:
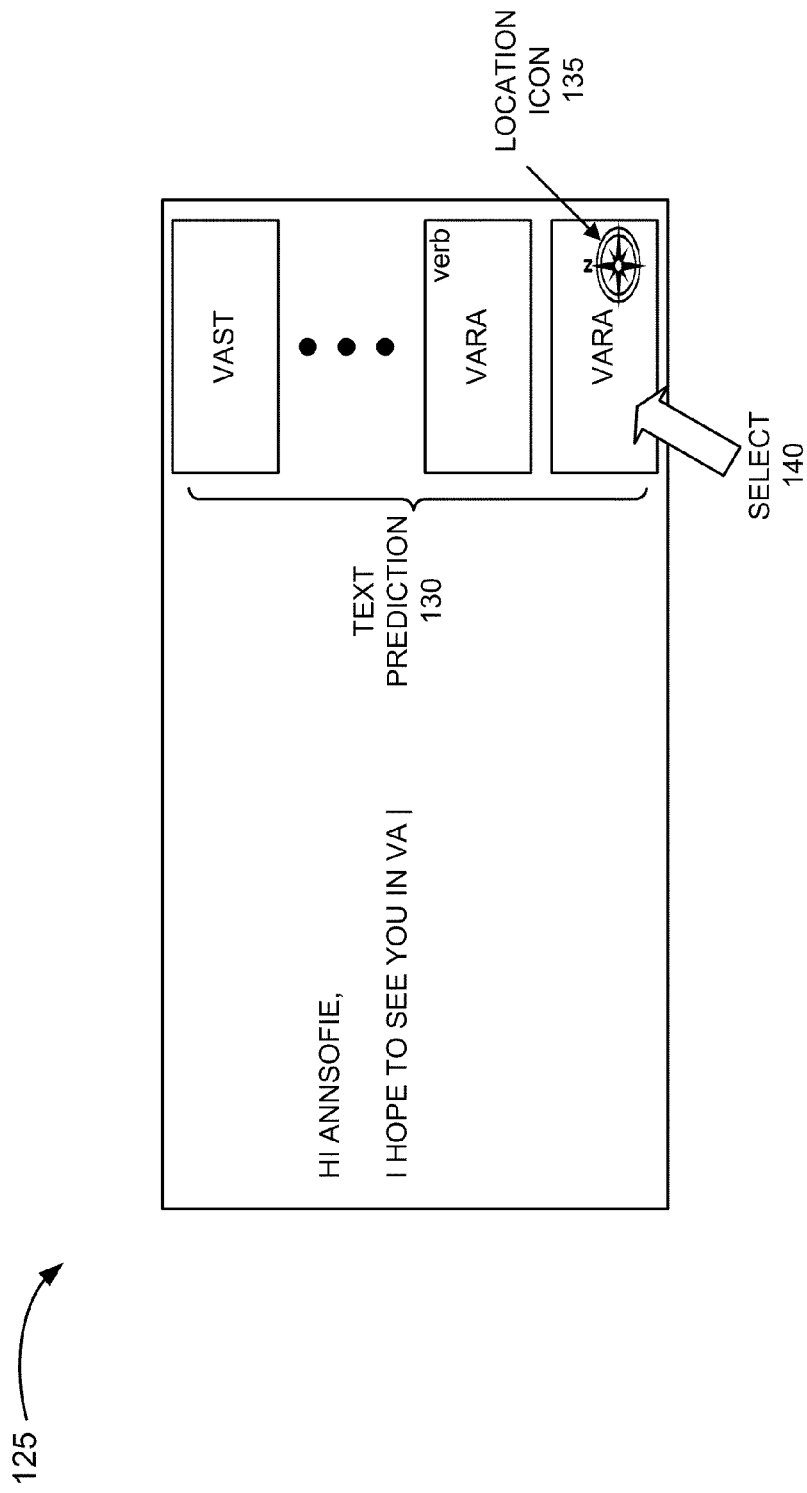

Referring to FIG. 1B, according to an exemplary scenario, user 105-1 may wish to author a text message 120 via user device 110-1. During the composition of text message 120, user device 110-1 may provide a user interface 125 that allows user 105-1 to select the meaning of words. For example, referring to FIG. 1C, according to an exemplary implementation, user device 110-1 may include a text prediction dictionary. The text prediction dictionary may include semantic information. For example, consider the word "vara," which is a Swedish word. The semantic information may indicate that "vara" may have a meaning corresponding to a verb, an adverb, or a location. As illustrated in FIG. 1C, user interface 125 may include a text prediction 130 that provides possible words to complete the word "va" in text message 120. In this example, text prediction 130 may include instances of the word "vara," in which "vara" may have a meaning corresponding to a verb, adverb or a location. According to an exemplary implementation, text prediction 130 may indicate the meaning of the text-predicted words using icons. For example, text prediction 130 may include a location icon 135 to indicate to user 105-1 that this instance of the word "vara" means a location. According to other exemplary implementations, text prediction 130 may indicate the meaning of the text-predicted words by some other manner (e.g., textually, etc.). User 105-1 may select 140 from text prediction 130 the appropriate word and semantic information (e.g., "vara" that means a location). According to other implementations, semantic information may be provided to the user when text prediction 130 is not provided. That is, for example, the user may complete the entry of a word (e.g., vara), without being presented with possible words (e.g., vast), but the user may be presented with a semantic information regarding the meaning of the word (e.g., location, verb, etc.).

Figure 1D:
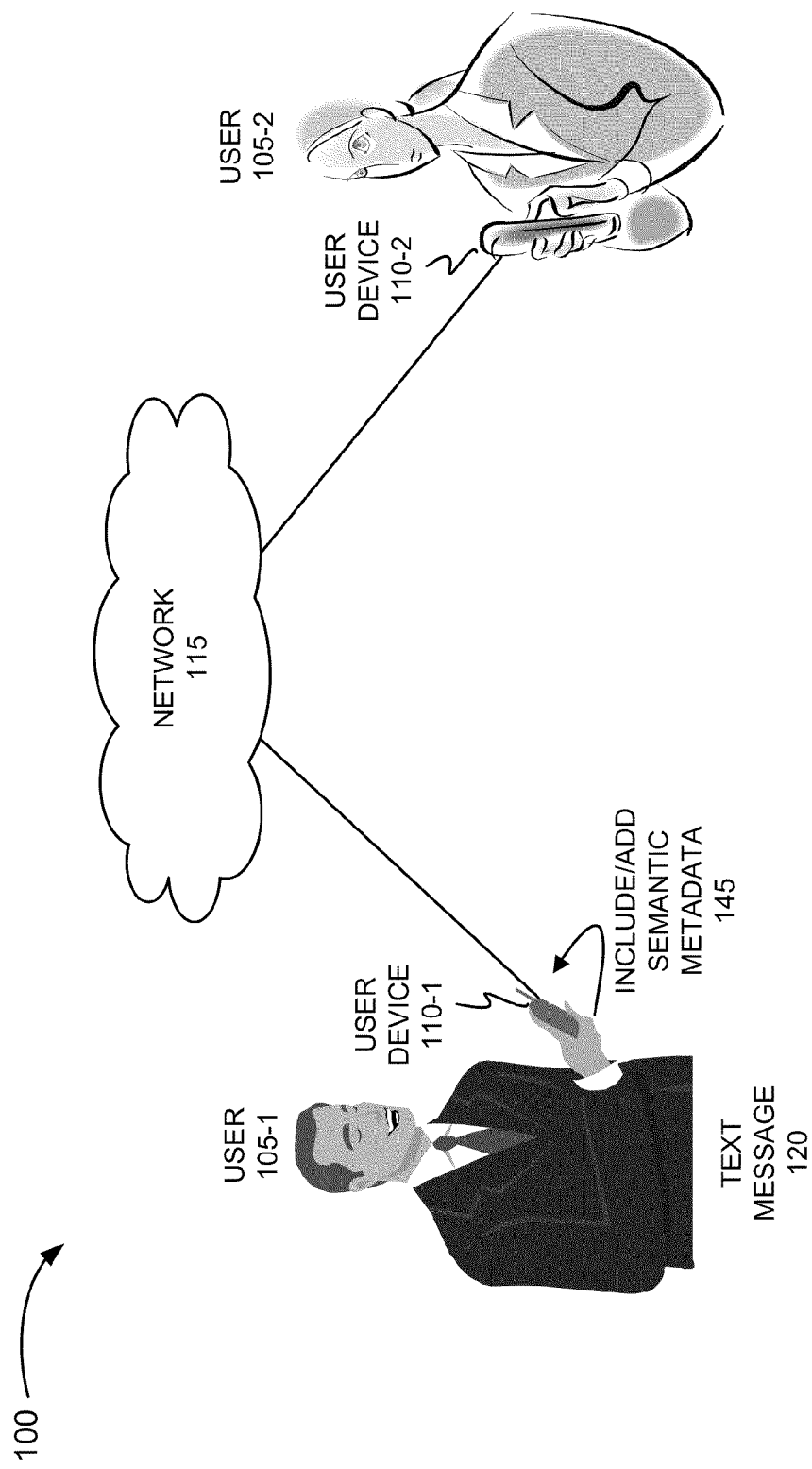
Figure 1E:
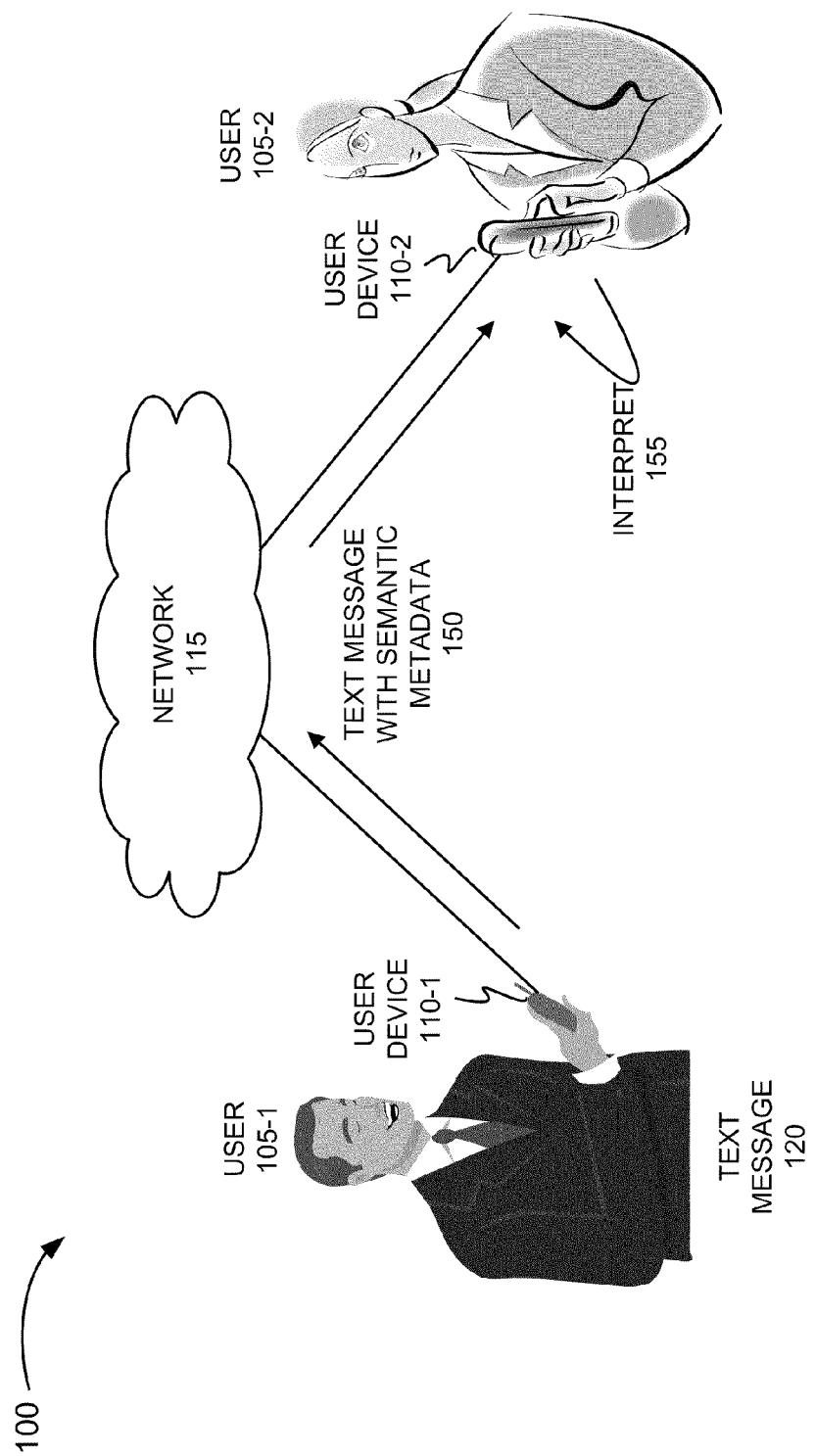

Based on user's 105-1 selection, user device 110-1 may include/add semantic metadata 145 to text message 120, as illustrated in FIG. 1D. User device 110-1 may send text message with semantic metadata 150 to user 105-2, as illustrated in FIG. 1E. User device 110-2 may interpret 155 text message with semantic metadata 150 based on the semantic metadata.

Figure 2:
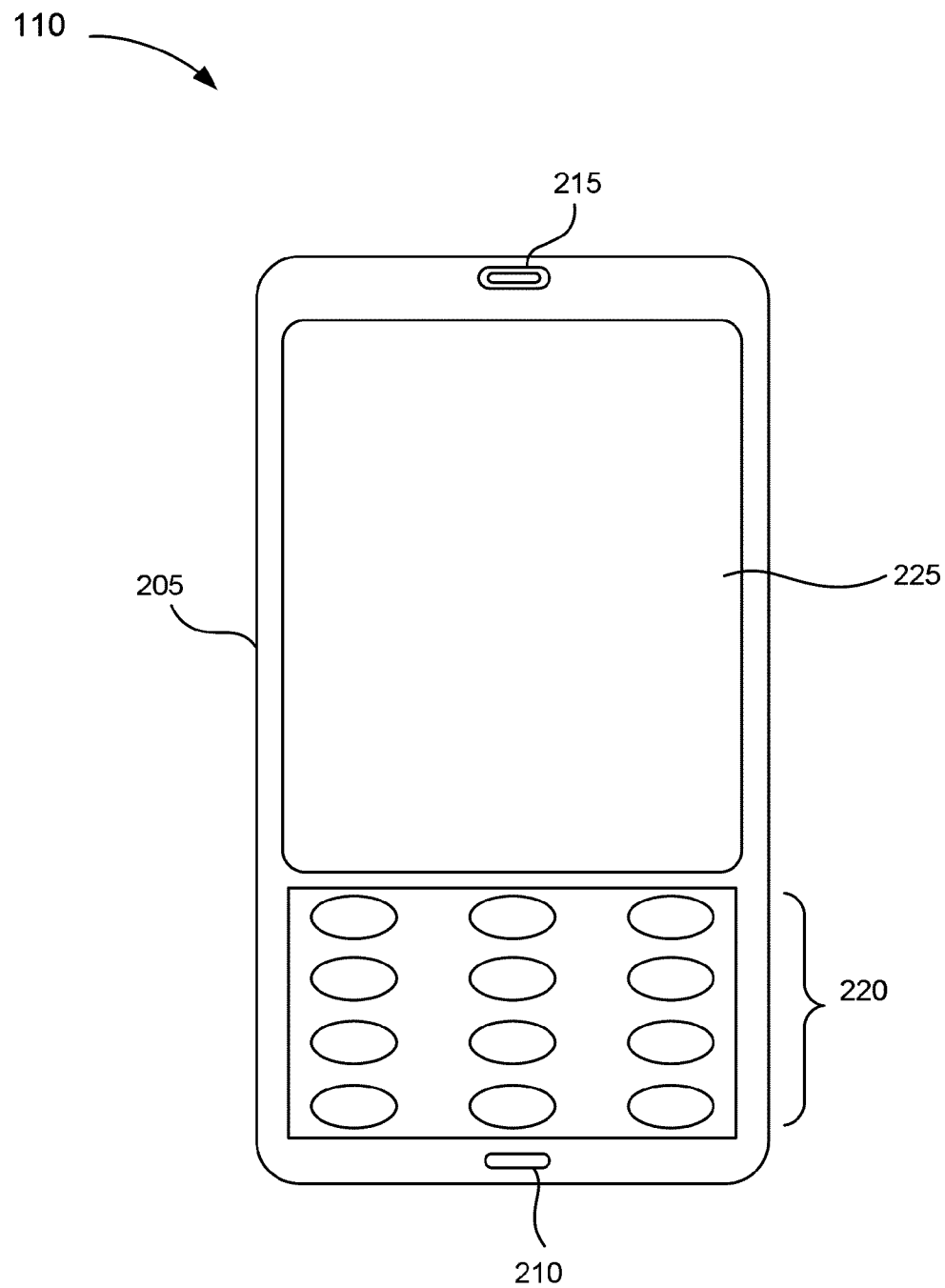
FIG. 2 is a diagram illustrating an exemplary user device in which exemplary embodiments described herein may be implemented.

FIG. 2 is a diagram illustrating an exemplary user device 110 in which exemplary embodiments described herein may be implemented. As illustrated in FIG. 2, user device 110 may comprise a housing 205, a microphone 210, speakers 215, keys 220, and a display 225. According to other embodiments, user device 110 may comprise fewer components, additional components, different components, and/or a different arrangement of components than those illustrated in FIG. 2 and described herein.

Housing 205 may comprise a structure to contain components of user device 110. For example, housing 205 may be formed from plastic, metal, or some other type of material. Housing 205 may structurally support microphone 210, speakers 215, keys 220, and display 225.

Microphone 210 may transduce a sound wave to a corresponding electrical signal. For example, a user may speak into microphone 210 during a telephone call, to execute a voice command, to execute a voice-to-text conversion, etc. Speakers 215 may transduce an electrical signal to a corresponding sound wave. For example, a user may listen to music, to a calling party, etc., through speakers 215.

Keys 220 may provide input to user device 110. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send a message, place a call, etc.).

Display 225 may operate as an output component. For example, display 225 may comprise a liquid crystal display (LCD), a plasma display panel (PDP), a field emission display (FED) a thin film transistor (TFT) display, or some other type of display technology.

Additionally, according to an exemplary implementation, display 225 may operate as an input component. For example, display 225 may comprise a touch-sensitive screen. In such instances, display 225 may correspond to a single-point input device (e.g., capable of sensing a single touch) or a multipoint input device (e.g., capable of sensing multiple touches that occur at the same time). Display 225 may be implemented using one of a variety of sensing technologies, such as, for example, capacitive sensing, surface acoustic wave sensing, resistive sensing, optical sensing, pressure sensing, infrared sensing, or gesture sensing. Display 225 may also comprise an auto-rotating function.

Display 225 may be capable of displaying text, pictures, and video. Display 225 may also be capable of displaying various images (e.g., icons, objects, etc.) that may be selected by a user to access various applications, enter data, navigate through user interfaces, etc.

FIG. 3 is a diagram illustrating exemplary components of user device 110. As illustrated, user device 110 may include a bus 305, a processing system 310, a memory/storage 315 that may comprise applications 320, a communication interface 325, an input 330, and an output 335. According to other embodiments, user device 110 may comprise fewer components, additional components, different components, and/or a different arrangement of components than those illustrated in FIG. 3 and described herein.

Bus 305 may include a path that permits communication among the components of user device 110. For example, bus 305 may include a system bus, an address bus, a data bus, and/or a control bus. Bus 305 may also include bus drivers, bus arbiters, bus interfaces, and/or clocks.

Processing system 305 may include one or multiple processors, microprocessors, data processors, co-processors, application specific integrated circuits (ASICs), system-on-chips (SOCs), application specific instruction-set processors (ASIPs), controllers, programmable logic devices (PLDs), chipsets, field programmable gate arrays (FPGAs), and/or some other processing logic that may interpret and/or execute instructions and/or data. Processing system 305 may control the overall operation, or a portion of operation(s) performed by user device 110. Processing system 305 may perform operations based on an operating system and/or various applications (e.g., applications 320). Processing system 305 may access instructions from memory/storage 315, from other components of user device 110, and/or from a source external to user device 110 (e.g., another device or a network).

Memory/storage 315 may comprise one or multiple memories and/or one or multiple secondary storages. For example, memory/storage 315 may comprise a random access memory (RAM), a dynamic random access memory (DRAM), a static random access memory (SRAM), a read only memory (ROM), a programmable read only memory (PROM), a ferroelectric random access memory (FRAM), an erasable programmable read only memory (EPROM), a flash memory, and/or some other form of storing hardware. Memory/storage 315 may comprise a hard disk (e.g., a magnetic disk, an optical disk, a magneto-optic disk, a solid state disk, etc.) and/or some other type of storing medium (e.g., a computer-readable medium, a compact disk (CD), a digital versatile disk (DVD), or the like) along with a corresponding drive. The term "computer-readable medium," as used herein, is intended to be broadly interpreted to comprise, for example, a memory, a secondary storage, a compact disc (CD), a digital versatile disc (DVD), or the like. Memory/storage 315 may comprise a memory, a storage device, or a storage component that is external to and/or removable from user device 110, such as, for example, a Universal Serial Bus (USB) memory, a dongle, a hard disk, mass storage, off-line storage, or the like.

Memory/storage 315 may store data, applications 320, and/or instructions related to the operation of user device 110. Applications 320 may comprise software that provides various services or functions. By way of example, applications 320 may comprise a telephone application, a voice recognition application, a video application, a multi-media application, a music playing application, a texting application, an instant messaging application, etc. Applications 320 may comprise one or multiple applications for providing user-based semantic metadata with a text message and interpreting the text message based on the metadata, as described herein. Applications 320 may provide user interfaces to permit the user to select semantic information.

Communication interface 325 may permit user device 110 to communicate with other devices, networks, and/or systems. For example, communication interface 325 may comprise one or multiple wireless and/or wired communication interfaces. Communication interface 325 may comprise a transmitter, a receiver, or a transceiver. Communication interface 325 may operate according to one or multiple protocols, communication standards, or the like.

Input 330 may permit an input into user device 110. For example, input 330 may comprise a keyboard, a keypad (e.g., keys 220), a touch screen (e.g., display 225), a touch pad, a mouse, a port, a button, a switch, a microphone (e.g., microphone 210), voice recognition logic, an input port, a knob, and/or some other type of input component. Output 335 may permit user device 110 to provide an output. For example, output 335 may include a display (e.g., display 225), a speaker (e.g., speakers 215), light emitting diodes (LEDs), an output port, a vibratory mechanism, or some other type of output component.

User device 110 may perform operations in response to processing system 310 executing software instructions contained in a computer-readable medium, such as, memory/storage 315. For example, the software instructions may be read into memory/storage 315 from another computer-readable medium or from another device via communication interface 325. The software instructions stored in memory/storage 315 may cause processing system 305 to perform various processes described herein. Alternatively, user device 110 may perform processes based on hardware, hardware and firmware, and/or hardware, software, and firmware.

Figure 4A:
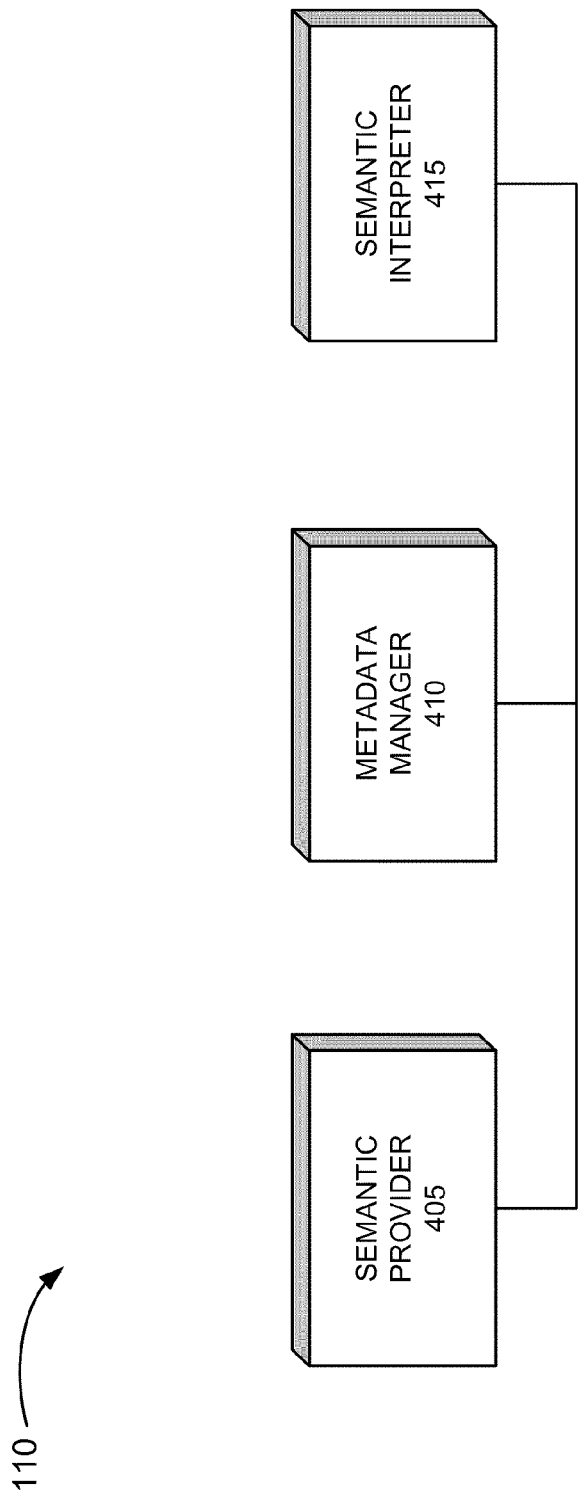
FIG. 4A is a diagram illustrating exemplary functional components of the user device.

FIG. 4A is a diagram illustrating exemplary functional components of user device 110. As illustrated, user device 110 may include a semantic provider 405, a metadata manager 410, and a semantic interpreter 415. By way of example, semantic provider 405, metadata manager 410, and/or semantic interpreter 415 may be implemented with a texting client (e.g., an e-mail client, an MMS client, etc.), as a plug-in to the texting client, or independent from the texting client.

Semantic provider 405 may comprise semantic information associated with words. For example, according to an exemplary implementation, semantic provider 405 may operate in conjunction with a text prediction engine. The text prediction engine may comprise a database of words (e.g., a dictionary) and semantic information. For example, referring to FIG. 4B, a dictionary with semantic information database 420 may be stored in user device 110 and may be used by the text prediction engine. As illustrated, dictionary with semantic information 420 may comprise, among other types of information, a words field 425 and a semantic information field 430. Words field 425 may comprise words of one or more languages. Semantic information field 430 may comprise semantic information associated with the words in words field 425. By way of example, semantic information may comprise word type information (e.g., noun, adverb, adjective, verb, location name, brand name (e.g., a linguistic term for names of people, brands, or some other named entity), slang, etc.), as well as other types of information, which may or may not be displayed to the user (e.g., geographic coordinates, hyperlinks, Uniform Resource Identifier (URI), etc.).

Referring back to FIG. 4A, semantic provider 405 may provide a user interface to allow a user to select the meaning of words when composing a text message. As previously described, words may have more than one meaning and/or may correspond to more than one word type or word class (e.g., a noun, a verb, an adjective, an adverb, a location, a brand name, a trademark, or some other part of speech or word category). The user interface may indicate the meaning of words using one or multiple methods (e.g., by text, by icons, by objects, etc.).

Metadata manager 410 may generate semantic metadata based on a user's selection of semantic information associated with a word as received by semantic provider 405. Metadata manager 410 may include/add the semantic metadata to a text message. By way of example, the semantic metadata may take the form of a MIME attachment or XML snippets to HTML, using ENAMEX notation. For example, a text message that includes the statement "Annsofie bought 300 shares of Acme Corp. in 2006," may be expressed as:

<Enamex type=""Person"">Ansofie</
Enamex>bought <Numex type=""Quantity
"">300</Numex>shares of<Enamex
type""Organization"">Acme Corp.
</Enamex>in<Timex Type=""Date"">2006</
Timex>.

Alternatively, a URI may be included/added with the text message or other types of information (e.g., hyperlinks, geographic coordinates, etc.). For example, referring back to the text message illustrated in FIG. 1C, metadata manager 410 may include/add a URI, which may be expressed as:

"Hi Annsofie, I hope to see you in<a href="geo:
13.4125,103.8667">Vara</a>next week."

In view of the exemplary forms of the semantic metadata, the semantic metadata may be included/added with a text message in a manner such that a user device incapable of understanding/interpreting the semantic metadata may ignore the semantic metadata yet still interpret the text message without the assistance of the semantic metadata. In this way, the semantic metadata may not impede legacy user devices that do not include one or more of the functional components (i.e., semantic provider 405, metadata manager 410, semantic interpreter 415) included with user device 110.

Semantic interpreter 415 may interpret the semantic metadata. For example, when user device 110 receives a text message with the semantic metadata, user device 110 may interpret the text message based on the semantic metadata and provide, among other things, disambiguation. Additionally, as previously described, user device 110 may perform other user-assistive processes based on the interpretation of the text message. By way of example, user device 110 may permit a user to select a location name in the text message and automatically provide a map of the geographic area surrounding the location. Alternatively, user device 110 may interpret the text message based on the semantic metadata and automatically create a calendar event.

Since user device 110 may correctly interpret the text message, resource utilization may be significantly reduced. For example, according to a conventional approach, a user device that receives a text message may need to perform a lookup in a location database, which may be external to the user device (e.g., residing in a network), to provide disambiguation of a location name included in the text message. Additionally, for other types of non-specific location words (e.g., "centralen" (center) or "kiosken" (kiosk)), user device 110 may include/add semantic metadata to the text message to indicate that these words are to be interpreted as a location, which otherwise may not be correctly interpreted using other approaches.

Although FIG. 4A illustrates exemplary functional components of user device 110, according to other implementations, user device 110 may include fewer functional components, additional functional components, different functional components, and/or a different arrangement of functional components than those illustrated in FIG. 4A and described. Additionally, or alternatively, one or more operations described as being performed by a particular functional component may be performed by one or more other functional components, in addition to, or instead of, the particular functional component. Additionally, or alternatively, one or more of the functional components may be combined.

Figure 5:
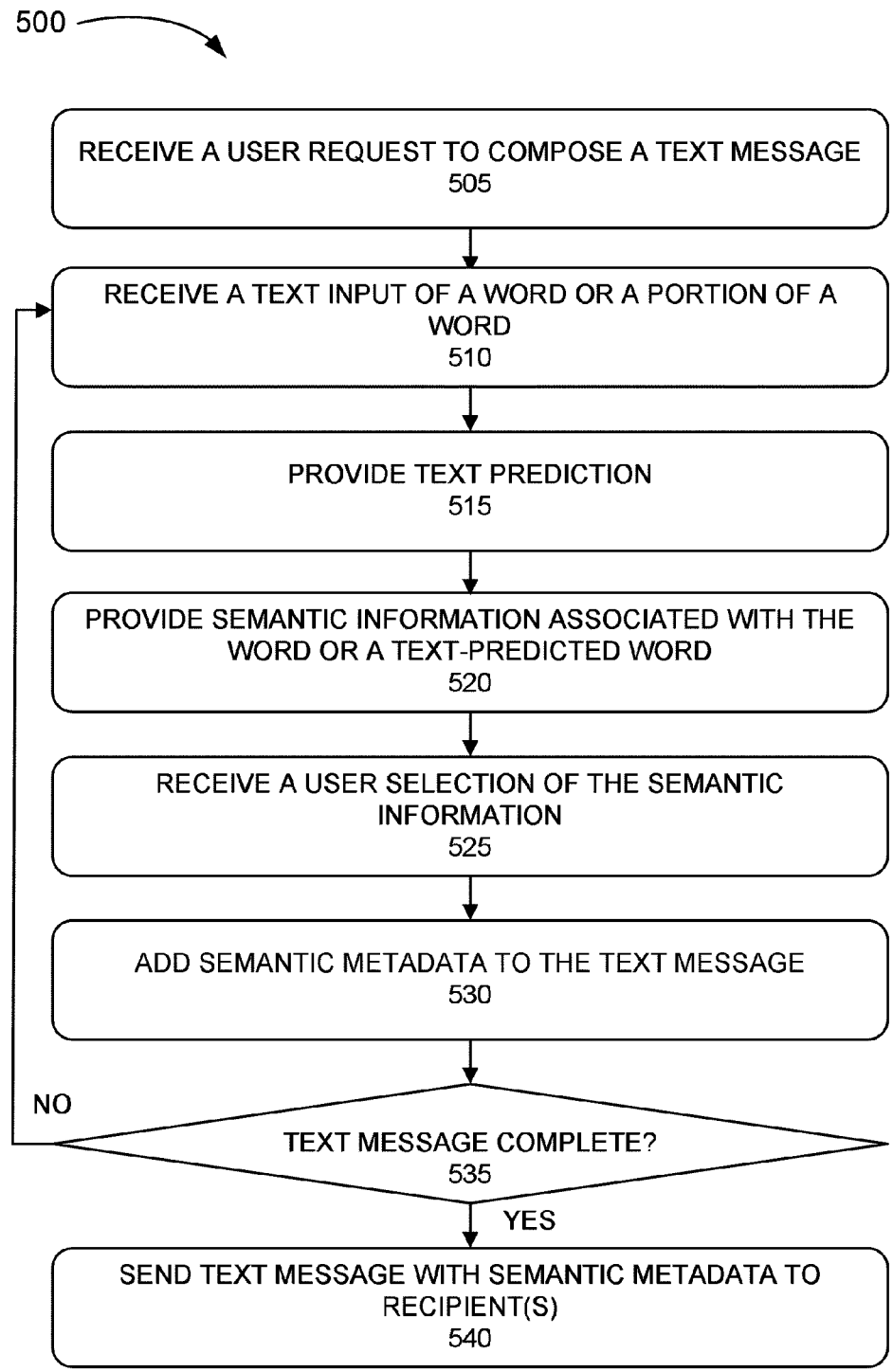
FIG. 5 is a flow diagram illustrating an exemplary process for providing user-based semantic metadata with a text message at a sending user device.

FIG. 5 is a flow diagram illustrating an exemplary process 500 for providing user-based semantic metadata with a text message. For example, process 500 may be performed by user device 110 that is a sending device of a text message.

Process 500 includes receiving a user request to compose a text message (block 505). For example, a text client (e.g., an MMS client, an e-mail client, etc.) of user device 110 may receive a user request to compose a text message.

A text input of a word or a portion of a word is received (block 510). For example, user device 110 may receive the user's text input of a word or a portion of a word during the composition of the text message.

Text prediction is provided (block 515). For example, user device 110 may include a text prediction engine that predicts/suggests possible or probable words based on the characters the user enters and words in a dictionary (e.g., dictionary with semantic information 420). The text-predictive word(s) is displayed to the user.

Semantic information associated with the word or a text-predicted word is provided (block 520). For example, as previously described, semantic provider 405 of user device 110 may provide to the user a user interface that permits the user to select semantic information associated with a word or a text-predicted word.

A user selection of the semantic information is received (block 525). For example, user device 110 may receive the user's selection of semantic information. In instances when the semantic information is coupled with a text-predicted word, the user selection may include both the text predicted word and the semantic information (e.g., as previously illustrated and described with respect to FIG. 1C).

Semantic metadata is added to the text message (block 530). For example, metadata manager 410 of user device 110 may add/include semantic metadata to the text message. For example, as previously described, semantic metadata may take the form of a MIME attachment, HTML, a URI, or some other suitable form of metadata.

It may be determined whether the text message is complete (block 535). For example, user device 110 may determine whether the text message is complete when the user chooses to send the message.

If it is determined that the text message is not complete (block 535—NO), process 500 may continue to block 510. If it is determined that the text message is complete (block 535—YES), a text message with the semantic metadata is sent to the recipient(s) (block 540).

Although FIG. 5 illustrates an exemplary process 500, in other implementations, process 500 may include additional operations, fewer operations, and/or different operations than those illustrated and described with respect to FIG. 5.

Figure 6:
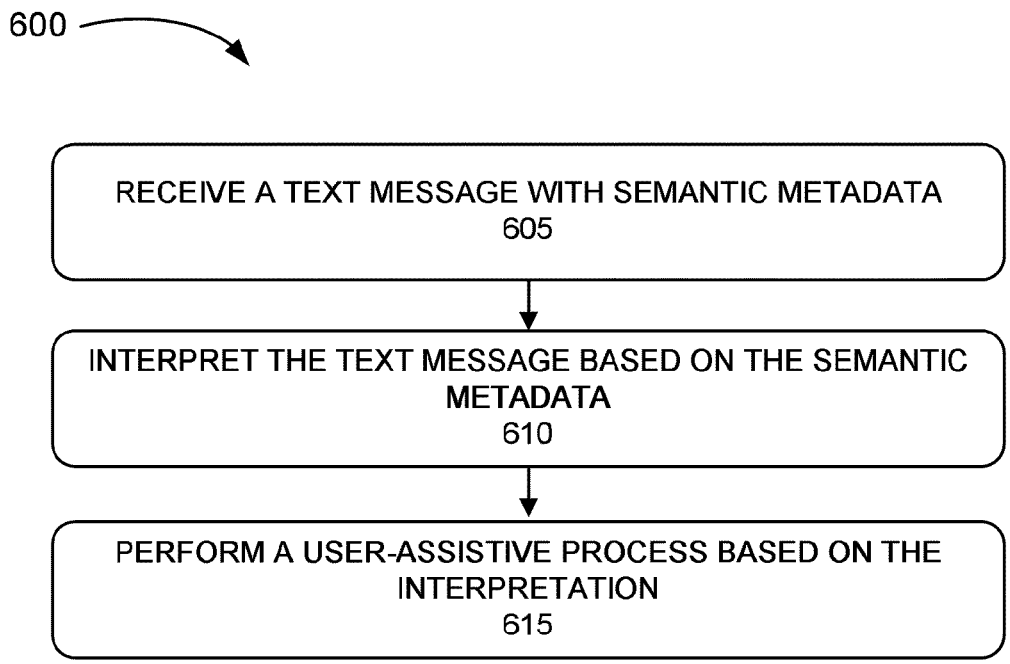
FIG. 6 is a flow diagram illustrating an exemplary process for interpreting a text message based on user-based semantic metadata at a receiving user device.

FIG. 6 is a flow diagram illustrating an exemplary process for interpreting a text message based on user-based semantic metadata. For example, process 600 may be performed by a user device that is a receiving device of a text message.

Process 600 includes receiving a text message with semantic metadata (block 605). For example, a text client (e.g., an MMS client, an e-mail client, etc.) of user device 110 may receive a text message with semantic metadata.

The text message is interpreted based on the semantic metadata (block 610). For example, semantic interpreter 415 of user device 110 may interpret the text message based on the semantic metadata.

A user-assistive process is performed based on the interpretation (block 615). For example, as previously described, user device 110 may perform various types of user-assistive processes, such as, providing mapping information, creating a calendar event, etc.

Although FIG. 6 illustrates an exemplary process 600, in other implementations, process 500 may include additional operations, fewer operations, and/or different operations than those illustrated and described with respect to FIG. 6.

Embodiment described herein may be implemented in many different forms of software, firmware, and/or hardware in the implementations illustrated in the figures. The actual software code or specialized control hardware used to implement aspects does not limit the invention. Thus, the operation and behavior of the aspects were described without reference to the specific software code—it being understood that software, firmware, and/or control hardware can be designed to implement the aspects based on the description herein. Embodiments described may also take the form of a computer program product on a computer-readable medium having code/instructions embodied therein.

Embodiments described herein may be implemented as a "component" or "logic" that performs one or more functions. This component or logic may include hardware (e.g., processing system 305), a combination of hardware and software (e.g., processing system 305 and applications 315), a combination of hardware, software, and firmware, or a combination of hardware and firmware.

The flowcharts and blocks illustrated and described with respect to FIGS. 5 and 6 illustrate exemplary processes according to exemplary embodiments. However, according to other embodiments, the function(s) or act(s) described with respect to a block or block(s) may be performed in an order that is different than the order illustrated and described. For example, two or more blocks may be performed concurrently, substantially concurrently, or in reverse order depending on, among other things, dependency.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

No element, act, or instruction disclosed in the specification should be construed as critical or essential to the embodiments described herein unless explicitly described as such.

The term "may" is used throughout this application and is intended to be interpreted, for example, as "having the potential to," "configured to," or "capable of," and not in a mandatory sense (e.g., as "must"). The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

What is claimed is:

1. A method performed by a user device to compose a text message, the method comprising:
   receiving a user request to compose a text message;
   receiving a text input;
   providing semantic information associated with the text input, wherein the semantic information includes text that indicates a part of speech corresponding to the text input, and wherein the text includes words including verb, noun, adverb, adjective, and slang;
   receiving a user selection of the semantic information;
   adding semantic metadata with the text message in correspondence to the user selection; and
   sending the text message with the semantic metadata to a recipient user device.

2. The method of claim 1, wherein the text input corresponds to a word or a portion of a word, and wherein the text includes words including a brand name and a trademark.

3. The method of claim 2, wherein when the text input corresponds to the portion of the word, the method further comprises:
   providing text prediction, wherein the semantic information is displayed with one or more text-predictive words.

4. The method of claim 1, wherein the semantic information includes a Uniform Resource Identifier.

5. The method of claim 1, wherein the semantic information comprises a geographic coordinate, and the method further comprises:
   receiving, by the recipient user device, the text message with the semantic metadata;
   receiving a user selection of a location name included in the text message; and
   displaying a map of a geographic area surrounding a location pertaining to the location name based on the geographic coordinate.

6. The method of claim 1, further comprising:
   receiving, by the recipient user device, the text message with the semantic metadata;
   interpreting the text message based on the semantic metadata; and
   automatically creating a calendar event in response to the interpreting.

7. The method of claim 1, wherein the text message corresponds to a multimedia messaging service message or an e-mail message.

8. The method of claim 1, wherein the adding comprises:
   adding the semantic metadata in a form corresponding to one of a Multipurpose Internet Mail Extension attachment, an Extensible Markup Language snippet, or a Uniform Resource Identifier.

9. A user device comprising:
   a communication interface;
   a processing system configured to:
      receive a user request to compose a text message;
      receive a text input;
      provide semantic information associated with the text input, wherein the semantic information includes text that indicates a part of speech that corresponds to the text input, and wherein the text includes words including verb, noun, adverb, adjective, and slang;
      receive a user selection of the semantic information;
      add semantic metadata with the text message in correspondence to the user selection; and
      send, via the communication interface, the text message with the semantic metadata to a recipient user device.

10. The user device of claim 9, wherein the user device comprises a wireless telephone.

11. The user device of claim 9, wherein the text input corresponds to a word or a portion of a word, and wherein the text includes words including at least one of a brand name or a trademark.

12. The user device of claim 11, wherein when the text input corresponds to the portion of the word, the processing system is further configured to:
provide text prediction.

13. The user device of claim 12, wherein the semantic information includes a Uniform Resource Identifier.

14. The user device of claim 9, wherein the text message corresponds to a multimedia message service or an e-mail message.

15. The user device of claim 9, wherein the processing system is further configured to:
receive, via the communication interface and from another user device, a text message with semantic metadata;
interpret the text message from the other user device based on the received semantic metadata; and
automatically create a calendar event in response to an interpretation of the text message from the other user device.

16. The user device of claim 9, wherein the semantic metadata is in a form corresponding to one of a Multipurpose Internet Mail Extension attachment, an Extensible Markup Language snippet, or a Uniform Resource Identifier.

17. A non-transitory storage medium storing instructions executable by at least one processing system, the non-transitory storage medium storing instructions for:
receiving a user request to compose a text message;
receiving a text input;
providing semantic information associated with the text input, wherein the semantic information includes words that indicate a part of speech that corresponds to the text input, and wherein the words include verb, noun, adverb, adjective, and slang;
receiving a user selection of the semantic information;
adding semantic metadata with the text message in correspondence to the user selection; and
sending the text message with the semantic metadata to a recipient user device.

18. The non-transitory storage medium of claim 17, wherein the non-transitory storage medium resides in a user device comprising a radio telephone, and wherein when providing, the non-transitory storage medium further storing one or more instructions for:
providing the semantic information via a graphical user interface, wherein the graphical user interface allows a user to select the semantic information that pertains to one or more instances of the text input.

19. The non-transitory storage medium of claim 17, the non-transitory storage medium further storing one or more instructions for:
providing text prediction, wherein the semantic information is displayed with one or more text-predictive words.

20. The non-transitory storage medium of claim 17, wherein the semantic information comprises a geographic coordinate, and the non-transitory storage medium further storing one or more instructions for:
receiving a text message with semantic metadata;
interpreting the received text message based on the received semantic metadata; and
automatically creating a calendar event in response to the interpreting.

* * * * *